(12) United States Patent
Huang

(10) Patent No.: US 9,700,836 B2
(45) Date of Patent: Jul. 11, 2017

(54) ELECTROCHEMICAL DOUBLE-CELL PLATE AND APPARATUS FOR EXHAUST EMISSIONS CONTROL

(71) Applicants: Ta-Yung Huang, Kaohsiung (TW); Ta-Hsin Huang, Kaohsiung (TW); Hsiu-Hsin Huang, Hsinchu (TW)

(72) Inventor: Ta-Jen Huang, Hsinchu (TW)

(73) Assignees: TA-YUNG HUANG, Kaohsiung (TW); TA-HSIN HUANG, Kaohsiung (TW); HSIU-HSIN HUANG, Hsinchu (TW)

( * ) Notice: Subject to any disclaimer, the term of this patent is extended or adjusted under 35 U.S.C. 154(b) by 62 days.

(21) Appl. No.: 14/789,521

(22) Filed: Jul. 1, 2015

(65) Prior Publication Data

US 2016/0001222 A1 Jan. 7, 2016

(30) Foreign Application Priority Data

Jul. 2, 2014 (TW) .............................. 103122786 A

(51) Int. Cl.
*B01D 53/32* (2006.01)
*C25B 11/03* (2006.01)
(Continued)

(52) U.S. Cl.
CPC .......... *B01D 53/326* (2013.01); *C25B 11/035* (2013.01); *C25B 11/041* (2013.01);
(Continued)

(58) Field of Classification Search
None
See application file for complete search history.

(56) References Cited

U.S. PATENT DOCUMENTS 4,199,554 A * 4/1980 Araki ................. B01D 53/8625
423/239.1
5,306,411 A * 4/1994 Mazanec .............. B01D 53/326
204/260
(Continued)

FOREIGN PATENT DOCUMENTS

JP 10-074528 A * 3/1998

OTHER PUBLICATIONS

Huang et al, Complete Emissions Control for Highly Fuel-Efficient Automobiles via a Simulated Stack of Electrochemical-Catalytic Cells, Energy & Environmental Science, No. 4, pp. 4061-4067, available Aug. 4, 2011.*

*Primary Examiner* — Harry D Wilkins, III
(74) *Attorney, Agent, or Firm* — Muncy, Geissler, Olds & Lowe, P.C.

(57) ABSTRACT

An electrochemical double-cell plate for exhaust emissions control is used to purify a lean-burn exhaust and comprises a substrate made of a metal or an alloy and having a reducing capability; a solid-oxide layer; a side layer; and a cathode layer. The solid-oxide layer and the side layer join to seal the substrate and respectively have a first dense structure and a second dense structure. The cathode layer completely covers the solid-oxide layer, made of a porous material and having an oxidizing environment. The oxidizing environment and the reducing capability generate an electromotive force between the substrate and the cathode layer. The electromotive force promotes sulfur oxides and nitrogen oxides of the lean-burn exhaust to decompose into sulfur vapor, oxygen and nitrogen. An electrochemical apparatus using the same for exhaust emissions control is also disclosed.

10 Claims, 5 Drawing Sheets

(51) Int. Cl.
*C25B 11/04* (2006.01)
*F01N 3/01* (2006.01)

(52) U.S. Cl.
CPC ...... *C25B 11/0405* (2013.01); *C25B 11/0431* (2013.01); *C25B 11/0478* (2013.01); *F01N 3/01* (2013.01); *B01D 2257/302* (2013.01); *B01D 2257/404* (2013.01); *B01D 2257/502* (2013.01); *B01D 2257/702* (2013.01); *B01D 2258/012* (2013.01); *Y02T 10/20* (2013.01)

(56) References Cited

U.S. PATENT DOCUMENTS

| | | | | |
|---|---|---|---|---|
| 5,401,372 | A | | 3/1995 | Liu et al. |
| 5,560,999 | A | * | 10/1996 | Pedicini ............ H01M 10/613 429/407 |
| 9,028,764 | B2 | | 5/2015 | Huang |
| 2003/0155254 | A1 | * | 8/2003 | Mazanec ............ B01D 53/326 205/633 |
| 2004/0197641 | A1 | * | 10/2004 | Visco ............ H01M 6/04 429/137 |
| 2004/0202924 | A1 | * | 10/2004 | Tao ............ H01M 4/9041 429/102 |
| 2010/0112454 | A1 | * | 5/2010 | Visco ............ H01B 1/122 429/246 |
| 2011/0274988 | A1 | * | 11/2011 | Fan ............ H01M 2/18 429/401 |
| 2012/0103795 | A1 | * | 5/2012 | Huang ............ B01D 53/326 204/248 |
| 2013/0078448 | A1 | * | 3/2013 | Tucker ............ B22F 7/004 428/319.1 |
| 2013/0112552 | A1 | * | 5/2013 | Huang ............ B01D 53/326 204/290.03 |

\* cited by examiner

ELECTROCHEMICAL DOUBLE-CELL PLATE AND APPARATUS FOR EXHAUST EMISSIONS CONTROL

FIELD OF THE INVENTION

The present invention relates to an electrochemical double-cell plate and apparatus, particularly to an electrochemical double-cell plate and apparatus for exhaust emissions control.

BACKGROUND OF THE INVENTION

The waste gas, which pollutes the air, includes nitrogen oxides ($NO_x$), sulfur oxides ($SO_x$), carbon monoxide (CO), hydrocarbons (HCs), and particulate matters (PMs). Researches show that sulfur oxides in the waste gas emitted by motorcycles, automobiles, factories, power plants seriously affect human health. Therefore, the industry and academia have paid much effort to develop technologies for effectively eliminating sulfur oxides in waste gas.

The emission standard of motor vehicles is improving persistently. However, the continuously increasing motor vehicles still bring about more and more serious air pollution. In a motor vehicle, the engine thereof burns fuel and converts chemical energy into mechanical energy. The burning process of fuel generates exhaust gases, including nitrogen oxides ($NO_x$), carbon monoxide (CO), hydrocarbons (HCs), and particulate matters (PM), which would form photochemical smog, cause acid rain, damage the ecological environment and endanger human health.

Carbon monoxide comes from imperfect combustion. The capability of carbon monoxide to combine with hemoglobin to form carboxyhemoglobin (COHb) is 300 times higher than the capability of oxygen to combine with hemoglobin to form oxyhemoglobin ($HbO_2$). Therefore, too high a concentration of carbon monoxide would degrade the capability of hemoglobin to transport oxygen. Nitrogen oxides are generated by the combination of nitrogen and oxygen and mainly in form of nitrogen monoxide (NO) and nitrogen dioxide ($NO_2$). Under radiation of ultraviolet ray, nitrogen oxides are likely to react with hydrocarbons to form toxic photochemical smog, which has a special odor, irritates eyes, harms plants, and decreases atmospheric visibility. Further, nitrogen oxides react with humidity in the air to form nitric acid and nitrous acid, which are contributors to acid rain. Hydrocarbons may irritate the respiratory system even at a lower concentration and will affect the central nervous system at higher concentration. Besides, particulate matters may endanger health or even cause cancer.

Therefore, many nations, including EU, USA, Japan and Taiwan, have regulated stricter emission standards for nitrogen oxides, carbon monoxide, hydrocarbons (HCs) and particulate matters, such as (BINS of USA and EURO 6 of EU), which not only regulate the emission of harmful exhaust gases but also encourage the manufacturers to develop, fabricate or use the newest pollution control technologies and apparatuses.

A U.S. Pat. No. 5,401,372 disclosed an "Electrochemical Catalytic Reduction Cell for the Reduction of $NO_x$ in an $O_2$-Containing Exhaust Emission", which is dedicated to removing nitrogen oxides, wherein an electrochemical catalytic reducing reaction and a vanadium pentaoxide ($V_2O_5$) catalyst convert nitrogen oxides into nitrogen. However, the prior-art device needs an electric source to power an electrochemical cell. Therefore, the prior-art device consumes more power but cannot eliminate other harmful gases simultaneously.

A U.S. Pat. No. 9,028,764 disclosed an "Electro-Catalytic Honeycomb for Exhaust Emissions Control", which can purify waste gas via eliminating nitrogen oxides, carbon monoxide, hydrocarbons (HCs) and particulate matters, wherein nitrogen oxides are decomposed into nitrogen and oxygen, and wherein carbon monoxide, hydrocarbons, and particulate matters are oxidized into water and carbon dioxide. The electro-catalytic honeycomb can eliminate several types of pollutants, neither consuming additional power nor using any reducing gas. However, the electro-catalytic honeycomb has higher fabrication cost. Besides, the electro-catalytic honeycomb is likely to be blocked while processing waste gas containing a higher concentration of particles.

SUMMARY OF THE INVENTION

The primary objective of the present invention is to solve the problem that the conventional electro-catalytic honeycomb for exhaust emissions control is expensive and likely to be blocked by particles while processing waste gas containing a high concentration of dust.

In order to achieve the abovementioned objective, the present invention proposes an electrochemical double-cell plate for exhaust emissions control, which is used to purify a lean-burn exhaust, and which comprises:

a substrate made of a metal or an alloy and functioning as a reducing substrate having a reducing capability, wherein the substrate has an outer surface, and wherein the outer surface has a top surface, a bottom surface opposite the top surface, and a side surface joined with the top surface and the bottom surface;

a solid-oxide layer covering the top surface and the bottom surface and having a first dense structure;

a side layer covering the side surface, having a second dense structure, and joining with the solid-oxide layer to seal the outer surface of the substrate; and a cathode layer covering the solid-oxide layer, made of a porous material, contacting the lean-burn exhaust, and having an oxidizing environment, wherein the oxidizing environment and the reducing capability generates an electromotive force between the substrate and the cathode layer and make the cathode layer have a first reactive side and a second reactive side respectively corresponding to the top surface and the bottom surface of the substrate, and wherein the electromotive force promotes sulfur oxides and nitrogen oxides of the lean-burn exhaust to undertake decomposition reactions on the first reactive side and the second reactive side to generate sulfur vapor, oxygen and nitrogen.

The present invention also proposes an electrochemical apparatus for exhaust emissions control, which is used to purify a lean-burn exhaust, and which comprises a plurality of the abovementioned electrochemical double-cell plates for exhaust emissions control; and a frame including an inlet allowing the lean-burn exhaust to flow into the electrochemical apparatus, an outlet allowing the lean-burn exhaust to flow out of the electrochemical apparatus, and an accommodation space disposed between the inlet and the outlet, wherein the electrochemical double-cell plates are disposed in the accommodation space and separated from each other to form at least one channel, and wherein the lean-burn exhaust flows through the channels and contacts first reactive sides and second reactive sides in the channels.

The electrochemical double-cell plate for exhaust emissions control of the present invention features a simple fabrication process. The substrate is used as the basic structure, and the solid-oxide layer, the cathode layer and the side layer are sequentially overlaid on the substrate. The substrate not only carries the solid-oxide layer and the cathode layer but also has a reducing capability and functions as an anode. The substrate is a simple planar structure, distinct from the honeycomb structure of the conventional electrocatalytic honeycomb apparatus, which is hard to fabricate and expensive. Therefore, the present invention has an advantage of low cost. The electrochemical double-cell plates for exhaust emissions control of the present invention can be installed in an accommodation space and separated from each other to form channels for the lean-burn exhaust. The channels of the present invention are less likely to be blocked by particles. Therefore, the electrochemical apparatus using the electrochemical double-cell plates of the present invention can process waste gas having a higher concentration of dust.

DETAILED DESCRIPTION OF THE PREFERRED EMBODIMENTS

The technical contents of the present invention will be described in detail in cooperation with the drawings below.

The present invention discloses an electrochemical double-cell plate for exhaust emissions control, which is used to purify a lean-burn exhaust. In the present invention, the lean-burn exhaust is referred to waste gas containing sulfur oxides ($SO_x$), nitrogen oxides ($NO_x$), carbon monoxide (CO), hydrocarbons (HCs), and particulate matters (PMs). The lean-burn exhaust may be but is not limited to be the waste gas emitted by motorcycles, automobiles, factories or power plants, or biogas. Below, the lean-burn exhaust emitted by power plants is used as the exemplification of the lean-burn exhaust.

Figure 1:
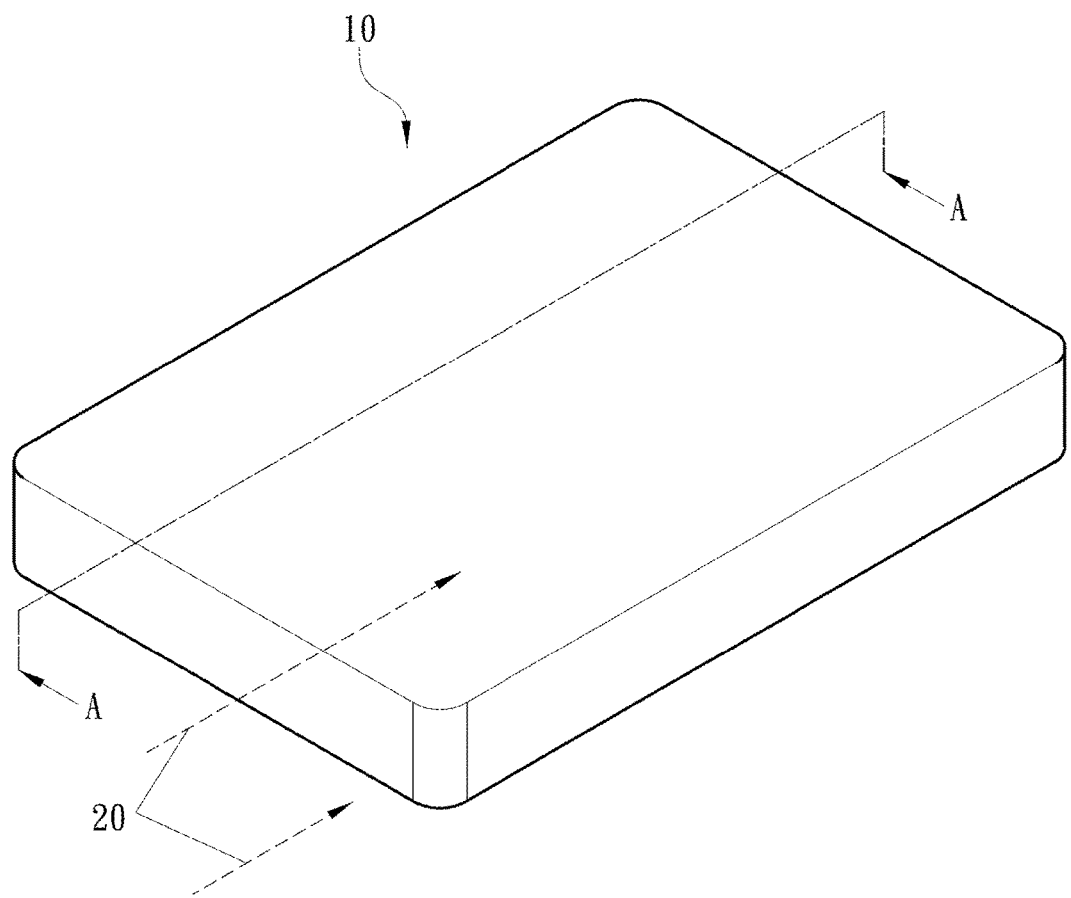
FIG. 1 is a perspective view schematically showing an electrochemical double-cell plate for exhaust emissions control according to a first embodiment of the present invention.
Figure 2:
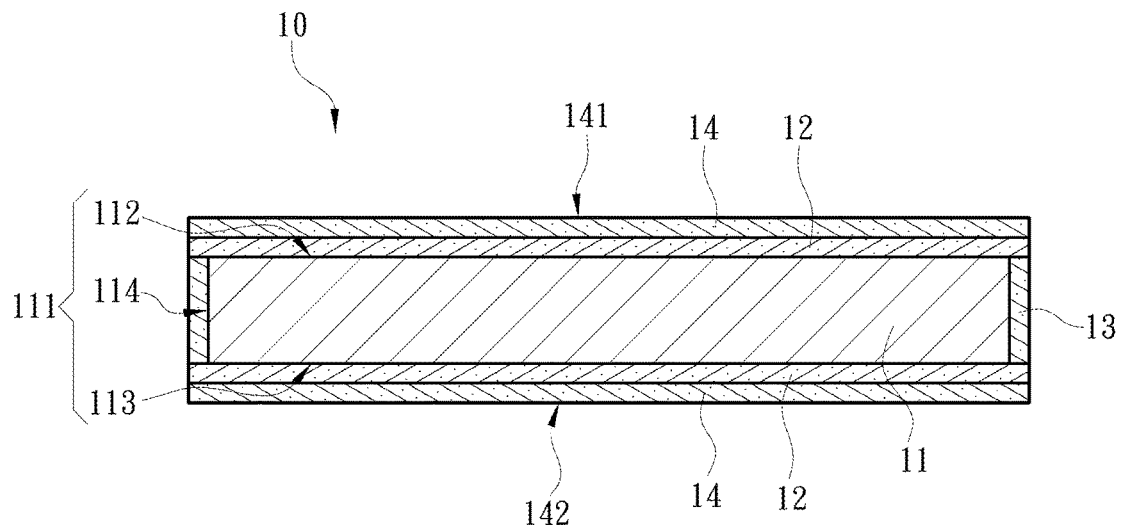
FIG. 2 is a sectional view taken along Line A-A of FIG. 1.

Refer to FIG. 1 and FIG. 2 respectively a perspective view schematically showing an electrochemical double-cell plate for exhaust emissions control according to a first embodiment of the present invention and a sectional view taken along Line A-A of FIG. 1. The electrochemical double-cell plate 10 for exhaust emissions control of the present invention is used to purify a lean-burn exhaust 20 and comprises a substrate 11, a solid-oxide layer 12, a side layer 13 and a cathode layer 14. The substrate 11 includes an outer surface 111. The outer surface 111 has a top surface 112, a bottom surface 113 opposite the top surface 112, and a side surface 114 joined with the top surface 112 and the bottom surface 113. The substrate 11 is made of a metal or an alloy and has a reducing capability. In the first embodiment, both the top surface 112 and the bottom surface 113 extend parallel and horizontally so that the substrate 11 is formed as a plate shape. In addition to carrying the solid-oxide layer 12 and the cathode layer 14, the substrate 11 also function as an anode because of its reducing capability.

The solid-oxide layer 12 covers the top surface 112 and the bottom surface 113. The solid-oxide layer 12 has a first dense structure. The side layer 13 covers the side surface 111. The side layer 13 has a second dense structure and joins with the solid-oxide layer 12 to seal the outer surface 111 of the substrate 11 so as to maintain the reducing capability of the substrate 11. The solid-oxide layer 12 is made of a fluorite-structure metal oxide or a perovskite-structure metal oxide, such as fluorite-structure yttria-stabilized zirconia (YSZ), fluorite-structure stabilized zirconia, fluorite-structure gadolinia-doped ceria (GDC), fluorite-structure doped ceria, perovskite-structure strontium/magnesium-doped lanthanum gallate (LSGM). The side layer 13 is made of glass or ceramic.

The cathode layer 14 covers the solid-oxide layer 12. The cathode layer 14 contacts the lean-burn exhaust 20 and has an oxidizing environment. The cathode layer 14 is made of a porous material and has a plurality of pores. The porous material is selected from a group consisting of perovskite-structure metal oxides, fluorite-structure metal oxides, metal-added perovskite-structure metal oxides, and metal-added fluorite-structure metal oxides, such as perovskite-structure lanthanum strontium cobalt oxides, lanthanum strontium manganese oxides, combinations of lanthanum strontium manganese oxides and yttria-doped ceria, and combinations of lanthanum strontium manganese oxides and gadolinia-doped ceria.

In the present invention, the reducing capability of the substrate 11 and the oxidizing environment of the cathode layer 14 generate an electromotive force between the substrate 11 and the cathode layer 14. Thereby, the cathode layer 14 has a first reactive side 141 and a second reactive side 142, which contact the lean-burn exhaust 20 and respectively correspond to the top surface 112 and the bottom surface 113 of the substrate 11. The electromotive force promotes the lean-burn exhaust 20 to undertake a decomposition reaction on the first reactive side 141 and the second reactive side 142 to generate sulfur vapor, oxygen and nitrogen. Thus, the waste gas is purified. In the present invention, the double cells of "electrochemical double-cell plate for exhaust emissions control" are referred to one electrochemical cells, which is formed by an upper portion of the substrate 11, the solid-oxide layer 12 and the cathode layer 14, and another electrochemical cell, which is formed by a bottom portion of the substrate 11, the solid-oxide layer 12 and the cathode layer 14. The practical operations and chemical reactions of the present invention will be described below.

Figure 3:
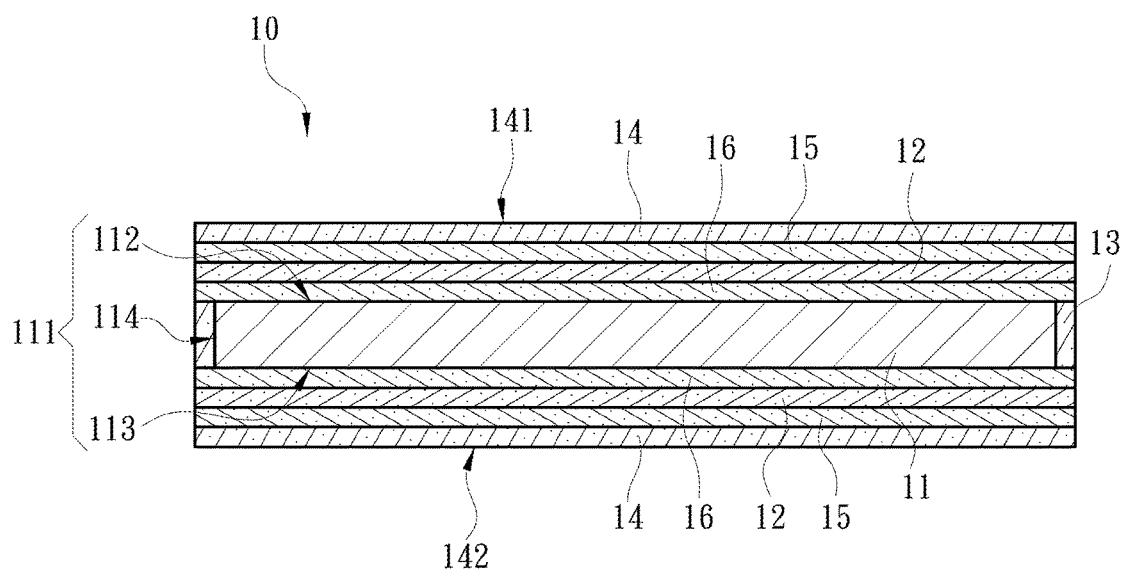
FIG. 3 is a sectional view schematically showing an electrochemical double-cell plate for exhaust emissions control according to a second embodiment of the present invention.

Refer to FIG. 3 a sectional view schematically showing an electrochemical double-cell plate for exhaust emissions control according to a second embodiment of the present invention. In the second embodiment, the electrochemical double-cell plate 10 for exhaust emissions control of the present invention further comprises an inter layer 15 and a powder layer 16. The inter layer 15 is disposed between the solid-oxide layer 12 and the cathode layer 14 to enhance the adherence of the solid-oxide layer 12 and the cathode layer 14. The inter layer 15 is made of a fluorite-structure metal oxide or perovskite-structure metal oxide, such as fluorite-structure gadolinia-doped ceria (GDC). The powder layer 16 is disposed between the outer surface 111 of the substrate 11 and the solid-oxide layer 12 and functions as a reducing material. The powder layer 16 fully contacts the substrate 11 and the solid-oxide 12 and effectively enhances the interaction of the substrate 11 and the solid-oxide layer 12. In other words, the powder layer 16 improves the reducing contact of the substrate 11 and the solid-oxide layer 12, enhances the reducing capability of the anode sides (i.e. the top surface 112 and the bottom surface 113), and thus favors creation of the electromotive force.

Figure 4:
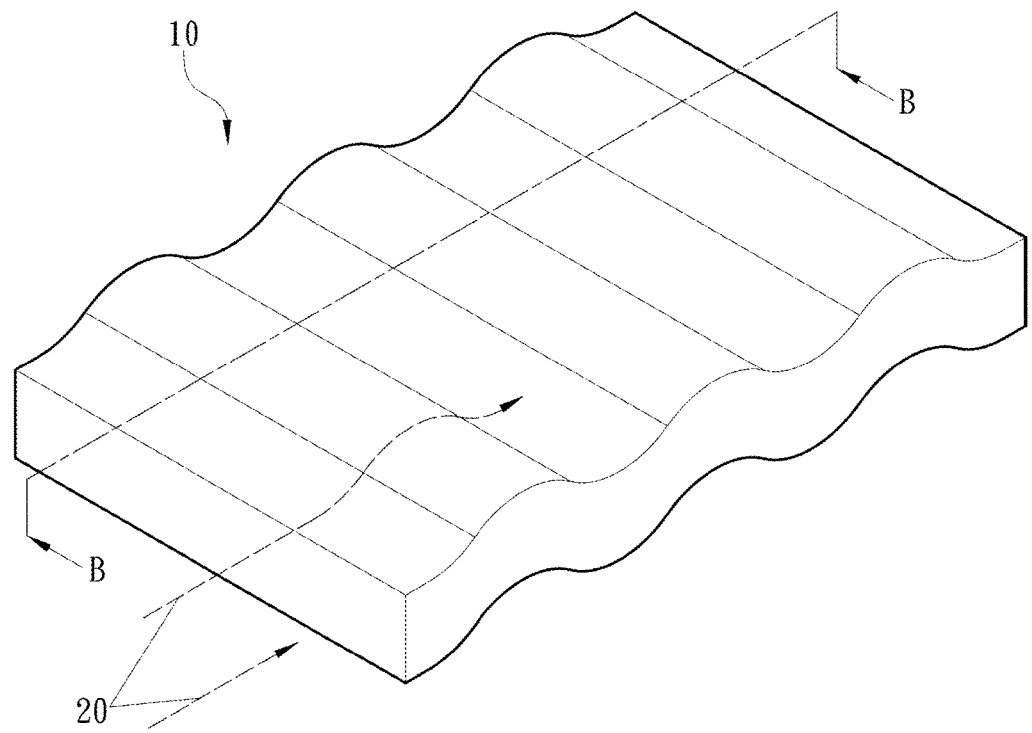
FIG. 4 is a perspective view schematically showing an electrochemical double-cell plate for exhaust emissions control according to a third embodiment of the present invention.
Figure 5:
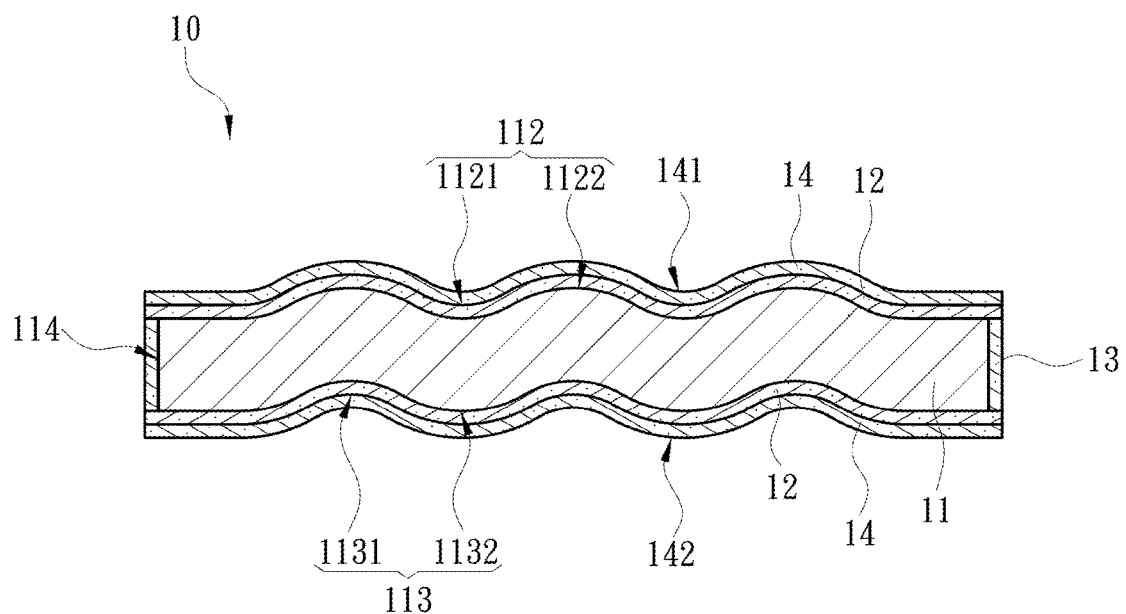
FIG. 5 is a sectional view taken along Line B-B of FIG. 4.

Refer to FIG. 4 and FIG. 5 respectively a perspective view schematically showing an electrochemical double-cell plate for exhaust emissions control according to a third embodiment of the present invention and a sectional view taken along Line B-B of FIG. 4. In the third embodiment, a plurality of upper recesses 1121 and a plurality of upper protrusions 1122, each of which neighbors two upper recesses 1121, are distributed horizontally on the top surface 112; a plurality of lower recesses 1131 and a plurality of lower protrusions 1132, each of which neighbors two lower recesses 1131, are distributed horizontally on the bottom surface 113. Because of the wave-like design of the substrate 11, the electrochemical double-cell plate 10 of the third embodiment has larger area of the first reactive side 141 and the second reactive side 142 of the cathode layer 14 than those of the first and second embodiments under the condition that the electrochemical double-cell plates 10 have identical length and width. Therefore, the electrochemical double-cell plate 10 of the third embodiment can process the lean-burn exhaust 20 at a higher efficiency.

Figure 6:
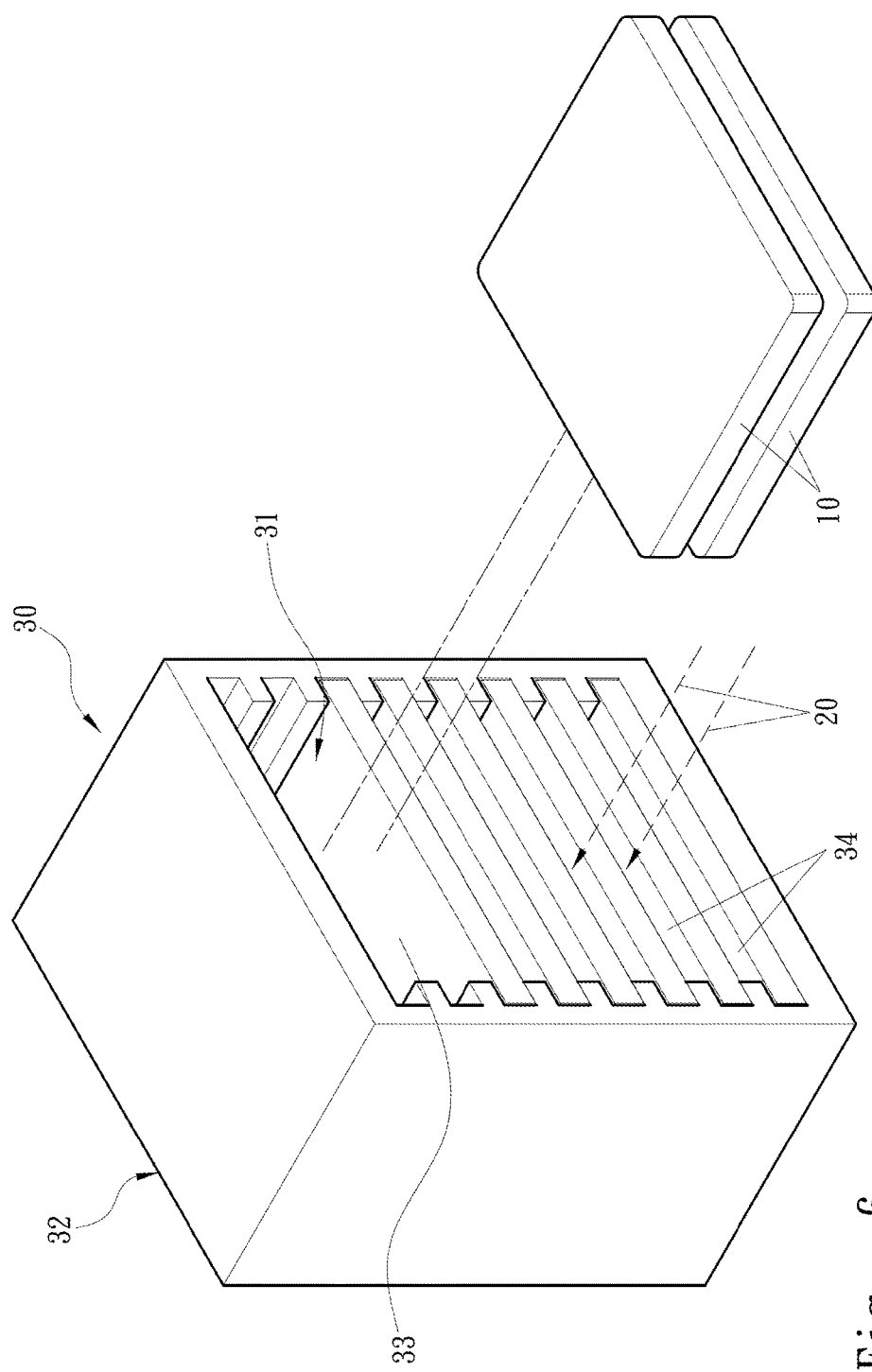
FIG. 6 is a perspective view schematically showing an electrochemical apparatus for exhaust emissions control according to a fourth embodiment of the present invention.

Refer to FIG. 6 a perspective view schematically showing an electrochemical apparatus for exhaust emissions control according to a fourth embodiment of the present invention. The electrochemical apparatus for exhaust emissions control comprises a plurality of electrochemical double-cell plates 10 and a frame 30. The frame 30 includes an inlet 31 allowing the lean-burn exhaust 20 to flow into the electrochemical apparatus, an outlet 32 allowing the lean-burn exhaust to flow out of the electrochemical apparatus, and an accommodation space 33 disposed between the inlet 31 and the outlet 32 and receiving the electrochemical double-cell plates 10. At least one channel 34 is formed between the electrochemical double-cell plates 10. The lean-burn exhaust 20 flows into the channels 34 via the inlet 31, contacts the first reactive sides 141 and the second reactive sides 142 in the channels 34 and then flows out of the electrochemical apparatus from the outlet 32. In the embodiment shown in FIG. 6, the electrochemical double-cell plates 10 are arranged in a way that the planes of the first reactive side 141 and the second reactive side 142 are parallel to the flow direction of the lean-burn exhaust 20, whereby the lean-burn exhaust 20 has the maximum contact area with the first reactive side 141 and the second reactive side 142. The design of the fourth embodiment makes the lean-burn exhaust 20 contact the surfaces of a plurality of first reactive side 141 and a plurality of second reactive sides 142. Thus, the waste gas can be purified more efficiently.

Figure 7:
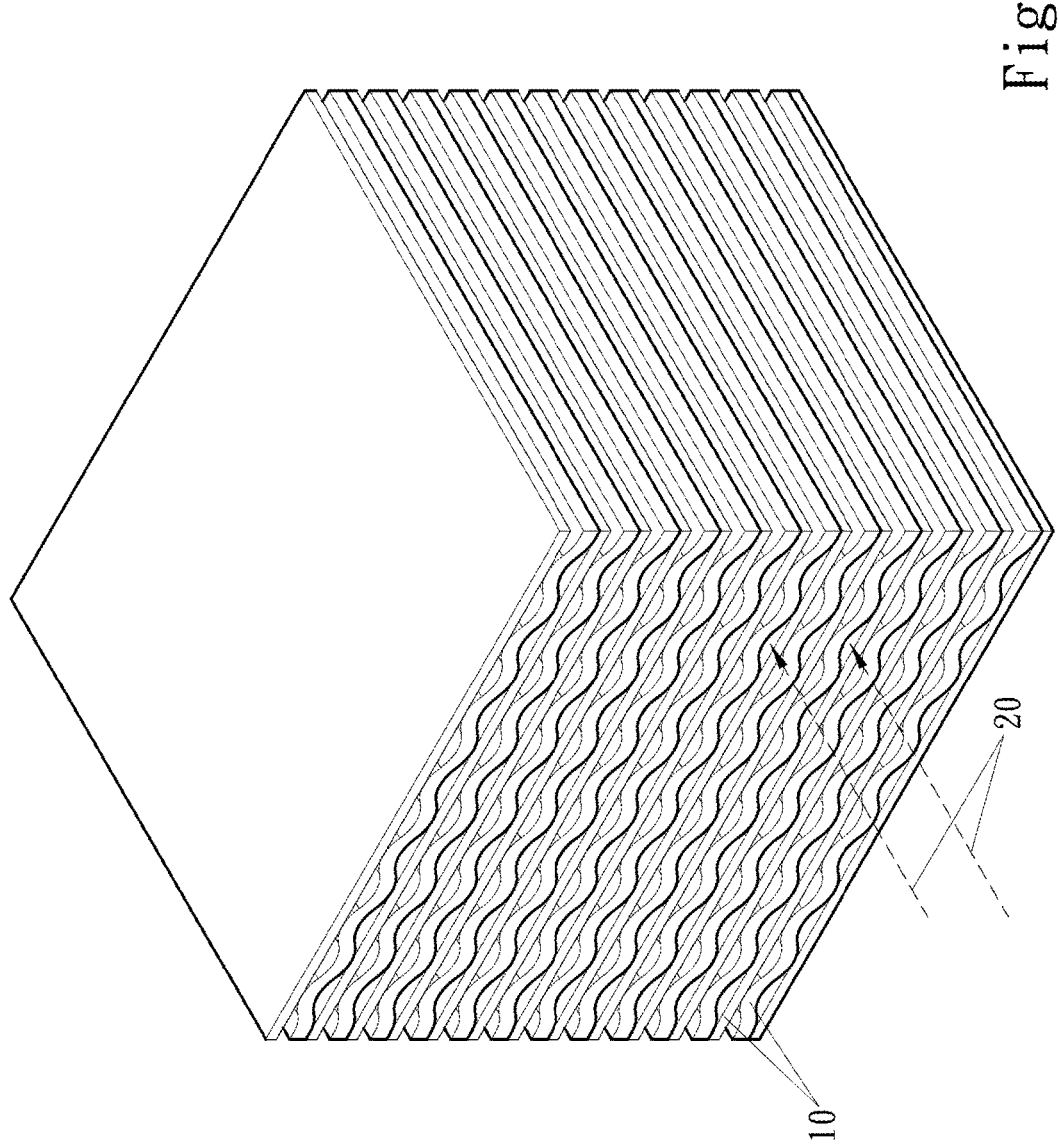
FIG. 7 is a perspective view schematically an electrochemical apparatus for exhaust emissions control according to a fifth embodiment of the present invention.

Refer to FIG. 7 a perspective view schematically an electrochemical apparatus for exhaust emissions control according to a fifth embodiment of the present invention. In the fifth embodiment, the electrochemical double-cell plates 10 fabricated with the wave-like substrates 11 and the electrochemical double-cell plates 10 fabricated with the planar substrates 11 are used jointly and arranged alternately. A plurality of channels is thus formed between the electrochemical double-cell plates 10. The flow of the lean-burn exhaust 20 in the fifth embodiment is shown in FIG. 7. Under the condition that the electrochemical apparatuses have an identical volume, the contact area of the lean-burn exhaust 20 and the cathode layer 14 is larger in the fifth embodiment than in the fourth embodiment shown in FIG. 6. Therefore, electrochemical apparatus of the fifth embodiment has a higher efficiency.

The principle and chemical reactions of processing the lean-burn exhaust 20 in the electrochemical double-cell plate 10 and electrochemical apparatus for exhaust emissions control will be described thereinafter. Below, the electrochemical double-cell plate 10 for exhaust emissions control is used to demonstrate the principle and chemical reaction of the present invention. The persons skilled in the art should be able to apply the principle to the electrochemical apparatus for exhaust emissions control. As mentioned above, the lean-burn exhaust 20 contains sulfur oxides, nitrogen oxides, carbon monoxide, hydrocarbons, and particulate matters. The purification reactions mainly include three portions: the reaction of eliminating nitrogen oxides, the reaction of eliminating carbon monoxide, hydrocarbons and particulate matters, and the reaction of eliminating sulfur oxides.

Elimination of Nitrogen Oxides

The nitrogen oxides mainly include nitrogen monoxide (NO) and nitrogen dioxide ($NO_2$). Nitrogen monoxide is decomposed into nitrogen and oxygen in the first reactive side 141 and the second reactive side 142 of the cathode layer 14; the reaction thereof is expressed by Formula (a):

$$2NO \rightarrow N_2 + O_2 \quad (a)$$

Nitrogen dioxide is decomposed into nitrogen monoxide and oxygen in the first reactive side 141 and the second reactive side 142 of the cathode layer 14; the reaction thereof is expressed by Formula (b):

$$2NO_2 \rightarrow 2NO + O_2 \quad (b)$$

The nitrogen monoxide generated in Reaction (b) (the reaction expressed by Formula (b)) is further decomposed into nitrogen and oxygen in the first reactive side 141 and the second reactive side 142 of the cathode layer 14.

The reducing capability of the substrate 11 and the oxidizing environment of the cathode layer 14 generate different equilibrium oxygen partial pressures respectively in the substrate 11 and the cathode layer 14 and generate an electromotive force (emf) between the substrate 11 and the cathode layer 14. The electromotive force drives the nitrogen oxides of the lean-burn exhaust 20 to decompose and generate nitrogen and oxygen. The electromotive force is generated according to the following principle:

$$\mathrm{emf} = [(RT)/(4F)] \cdot \ln[(P_{O_2|Cathode})/(P_{O_2|Anode})] \quad (c)$$

wherein R is the gas constant, T the absolute temperature, F the Faraday constant, and $P_{O_2}$ the equilibrium oxygen partial pressure. The substrate 11, which is made of a metal or an alloy, is a reducing material, generating an environment of a very low equilibrium oxygen partial pressure in the anode and thus having a greater electromotive force. Different reducing compounds lead to different equilibrium oxygen partial pressures in the anode and thus generate different electromotive forces. In the cathode, different concentrations of oxygen correspond to different equilibrium oxygen partial pressures and generate different electromotive forces. In other words, the larger the concentration of oxygen of the lean-burn exhaust 20 in the cathode, the greater the electromotive force; the greater the electromotive force, the higher the reaction rate of decomposition of nitrogen oxides.

Elimination of Carbon Monoxide, Hydrocarbons and Particulate Matters

As the lean-burn exhaust 20 is abundant of oxygen, the cathode layer 14 can catalyze oxidizing reactions to convert carbon monoxide, hydrocarbons and particulate matters into harmless gases. The carbon monoxide can be oxidized into carbon dioxide; the hydrocarbons and the particulate matters (containing carbon) can be oxidized into carbon dioxide and water; the reactions can be respectively expressed by Formulae (d)-(f):

$$2CO + O_2 \rightarrow 2CO_2 \quad (d)$$

$$HCs + O_2 \rightarrow H_2O + CO_2 \quad (e)$$

$$C + O_2 \rightarrow CO_2 \quad (f)$$

Therefore, the present invention can uses the electromotive force to drive decomposition reactions to eliminate nitrogen oxides and uses the oxidizing reactions to eliminate carbon monoxide, hydrocarbons and particulate matters. Thus, the present invention can effectively remove the harmful components in the lean-burn exhaust 20.

Elimination of Sulfur Oxides

The lean-burn exhaust 20 is cooled down to a temperature of lower than 200° C. and then passes through the electrochemical double-cell plates 10 for exhaust emissions control. In the electrochemical double-cell plates 10, the reducing capability of the substrates 11 and the oxygen-containing environment of the lean-burn exhaust 20 generate an electromotive force between the substrates 11 and the cathode layers 14. The electromotive force drives the sulfur oxides of the lean-burn exhaust 20 to decompose into sulfur vapor and oxygen in the cathode layers 14. After leaving the electrochemical double-cell plates 10, the sulfur vapor is cooled down to form solid-state sulfur crystals. Then, the sulfur crystals are collected. The abovementioned reactions can be respectively expressed by Formulae (g)-(i):

$$SO_3 \rightarrow SO_2 + O_2 \quad (g)$$

$$2SO_2 \rightarrow S_{2(g)} + 2O_2 \quad (h)$$

$$4S_{2(g)} S_{8(g)} \quad (i)$$

The sulfur oxides of the lean-burn exhaust 20 are mainly sulfur dioxide ($SO_2$) and a trace amount of sulfur trioxide ($SO_3$). While contacting the cathode layer 14, the sulfur trioxide ($SO_3$) of the lean-burn exhaust 20 undertakes a reaction expressed by Formula (g) and decomposes into sulfur dioxide ($SO_2$) and oxygen ($O_2$). The sulfur dioxide ($SO_2$) originally in the lean-burn exhaust 20 and the sulfur dioxide ($SO_2$) generated by the decomposition of sulfur trioxide ($SO_3$) undertakes a reaction expressed by Formula (h) and decomposes into sulfur vapor ($S_2$) and oxygen ($O_2$). In the electrochemical double-cell plates 10, the sulfur vapor of $S_2$ may further combine to form the sulfur vapor of $S_8$, as shown by Formula (i). At a temperature of lower than 200° C., $S_2$ may fully combine to form $S_8$. After leaving the electrochemical double-cell plates 10, the sulfur vapor of $S_8$ is cooled down to form solid-state sulfur crystals. Thus, the sulfur oxides are eliminated from the lean-burn exhaust 20. Then, the sulfur crystals are collected.

In conclusion, the present invention proposes an electrochemical double-cell plate for exhaust emissions control, which features a simple fabrication process, wherein a substrate is used as the basic structure, and the solid-oxide layer, the cathode layer and the side layer are sequentially overlaid on the substrate. The substrate not only carries the solid-oxide layer and the cathode layer but also has a reducing capability and functions as an anode. The substrate is a simple planar structure, distinct from the honeycomb structure of the conventional electrocatalytic honeycomb apparatus, which is hard to fabricate and expensive. Therefore, the present invention has an advantage of low cost. The electrochemical double-cell plates for exhaust emissions control of the present invention can be installed in an accommodation space and separated from each other to form channels for the lean-burn exhaust. The channels of the present invention are less likely to be blocked by particles. Therefore, the electrochemical apparatus using the electrochemical double-cell plates of the present invention can process waste gas having a higher concentration of dust.

What is claimed is:

1. An electrochemical double-cell plate purifying a lean-burn exhaust stream, containing sulfur oxides or nitrogen oxides, from a combustion process, the electrochemical double-cell plate comprises:
    a substrate made of a metal or an alloy, having a reducing capability, and including an outer surface, wherein the outer surface has a top surface, a bottom surface opposite the top surface, and a side surface joined with the top surface and the bottom surface;
    a solid-oxide layer covering the top surface and the bottom surface and having a first dense structure; and
    a cathode layer covering the solid-oxide layer, made of a porous material, contacting the lean-burn exhaust, and having an oxidizing environment,
    wherein the oxidizing environment and the reducing capability generate an electromotive force between the substrate and the cathode layer and make the cathode layer have a first reactive side and a second reactive side respectively corresponding to the top surface and the bottom surface of the substrate, and wherein the electromotive force promotes sulfur oxides and nitrogen oxides of the lean-burn exhaust to undertake decomposition reactions on the first reactive side and the second reactive side to generate sulfur vapor, oxygen and nitrogen.

2. The electrochemical double-cell plate according to claim 1, wherein the solid-oxide layer is made of a material selected from a group consisting of fluorite-structure metal oxides, perovskite-structure metal oxides, and combinations thereof.

3. The electrochemical double-cell plate according to claim 1, further comprising a side layer covering the side surface, having a second dense structure, and joining with the solid-oxide layer to seal the outer surface of the substrate, wherein the side layer is made of glass or ceramic.

4. The electrochemical double-cell plate according to claim 1, wherein the cathode layer is made of a material selected from a group consisting of perovskite-structure metal oxides, fluorite-structure metal oxides, metal-added perovskite-structure metal oxides, metal-added fluorite-structure metal oxides, and combinations thereof.

5. The electrochemical double-cell plate according to claim 1 further comprising an inter layer, which is interposed between the solid-oxide layer and the cathode layer to enhance the adherence of the solid-oxide layer and the cathode layer.

6. The electrochemical double-cell plate according to claim 5, wherein the inter layer is made of a material selected a group consisting of fluorite-structure metal oxides, perovskite-structure metal oxides, and combinations thereof.

7. The electrochemical double-cell plate according to claim 1, wherein both the top surface and the bottom surface extend parallel and horizontally to make the substrate a plate.

8. The electrochemical double-cell plate according to claim 1, wherein a plurality of upper recesses and a plurality of upper protrusions each neighboring two upper recesses are distributed horizontally on the top surface; a plurality of lower recesses and a plurality of lower protrusions each neighboring two lower recesses are distributed horizontally on the bottom surface.

9. The electrochemical double-cell plate according to claim 1 further comprising a powder layer, which is disposed between the outer surface of the substrate and the solid-oxide layer, and which is made of a metal or an alloy and enhances interaction of the substrate and the solid-oxide layer.

10. An electrochemical apparatus purifying a lean-burn exhaust stream, containing sulfur oxides or nitrogen oxides, from a combustion process, the electrochemical apparatus comprises:

a plurality of electrochemical double-cell plates according to claim 1; and a frame including an inlet allowing the lean-burn exhaust to flow into the electrochemical apparatus, an outlet allowing the lean-burn exhaust to flow out of the electrochemical apparatus, and an accommodation space disposed between the inlet and the outlet, wherein the electrochemical double-cell plates are disposed in the accommodation space and separated from each other to form at least one channel, and wherein the lean-burn exhaust flows through the channels and contacts first reactive sides and second reactive sides in the channels.

\* \* \* \* \*